2 Sheets—Sheet 1.
W. H. WARD,
TURN TABLE, &c.
No. 19,268.  Patented Feb. 2, 1858.
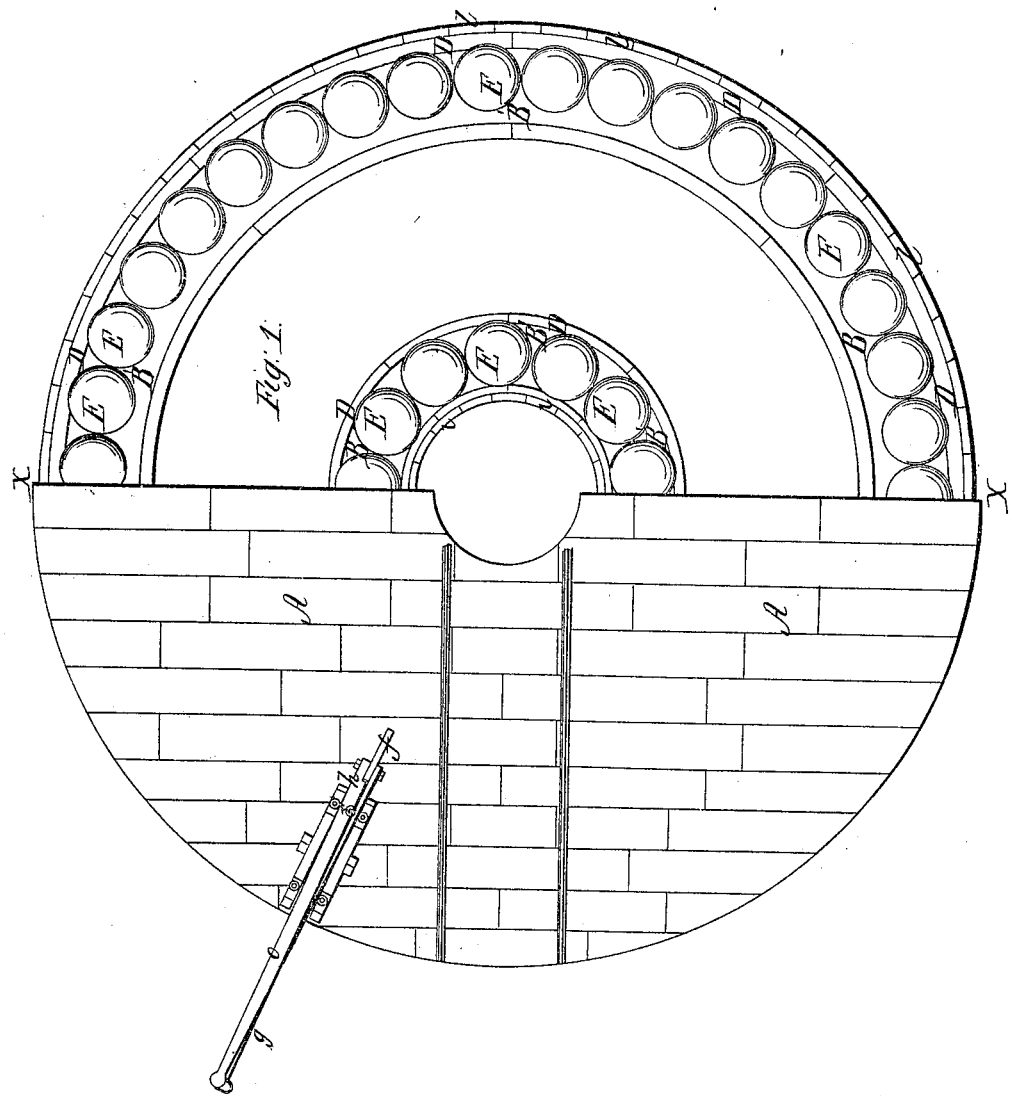

W. H. WARD,
TURN TABLE, &c.
No. 19,268.
Patented Feb. 2, 1858.
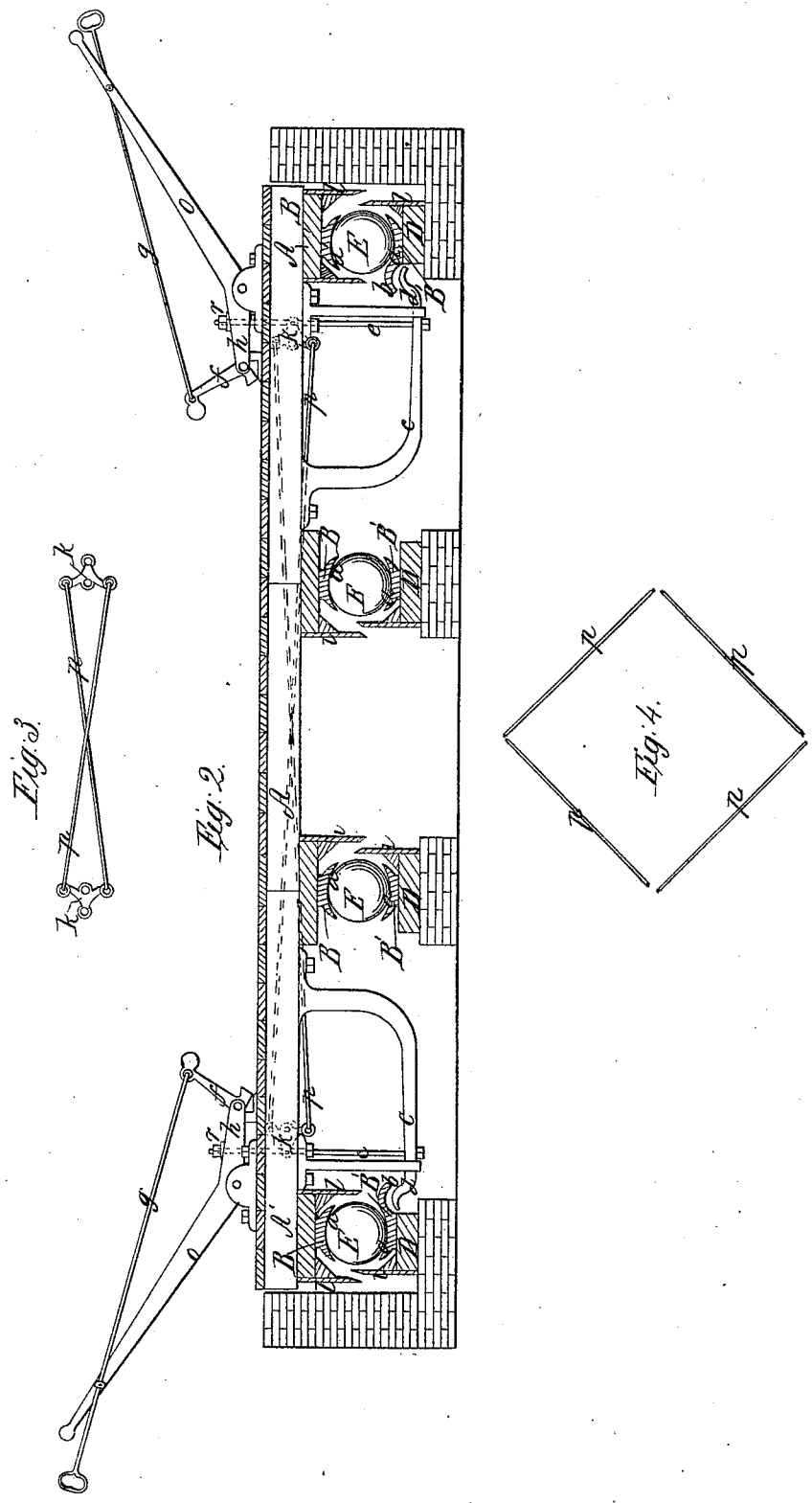

UNITED STATES PATENT OFFICE.

W. H. WARD, OF AUBURN, NEW YORK.

TURNING-TABLE FOR RAILWAYS.

Specification of Letters Patent No. 19,268, dated February 2, 1858.

*To all whom it may concern:*

Be it known that I, WILLIAM HENRY WARD, of the city of Auburn, county of Cayuga, and State of New York, have invented certain new and useful Improvements in Turning-Tables, of which the following is a full, clear, and exact description, reference being had to the accompanying drawings, forming part of this specification, in which—

Figure 1 represents a plan of my improved turning table, Fig. 2 represents a vertical section of the same on the line of X X of Fig. 1, Fig. 3 represents the arrangement of the connecting rods for operating opposite or side clamps by either of the levers, Fig. 4 represents the arrangement of the connecting rods for operating the clamps around the table.

Turning tables and swinging bridges, as generally constructed, are dependent in a great degree for their accuracy of adjustment, their capability of resisting shocks, the ease with which they turn, upon a central or guiding pivot. Any displacement or wearing of this pivot throws the table out of adjustment, the wheels to one side of their track and increases the friction of the parts to such degree that the table is rendered almost useless. In order to diminish the liability of displacing or bending the pivot, it is made of large size so as to bear the whole weight of the table or platform (with the load) and its base or socket supported by heavy and expensive foundations. Even with these precautions, the stability of the table or platform is not secure for any length of time, as the settlement of the foundation, or its displacement by heavy lateral shocks to which it is frequently subjected, (and which, from its construction, it is not capable of resisting) thus affects the position of the pivot, and the free and easy movement of the table or platform.

The object of my improvements is, to do away with the central pivot, thus diminishing the liability of the table being displaced or injured from the effects of heavy shocks, as it will then have the capability of yielding to them. To arrange the clamping mechanism so as to stop and clamp the table in any part of its revolution, and at the same time admit of its yielding to a certain extent laterally and diminish the cost of construction and repairs, and my invention for effecting these objects consists, first, in supporting and centering the table or platform without the aid of the central pivot and by means of one or more rings of spherical balls in connection with grooved circular tracks of such form in their cross section as to admit of lateral motion of the balls and also of the platform of the table, by which means the table is free to yield laterally to the shocks of locomotive engines or other bodies coming against or passing over it, and again recover its central position, thus avoiding the liability of being cramped or permanently displaced; second, in protecting the track from dust and also limiting the lateral movement of the table, and thus prevent the balls being carried beyond the edge of the track by means of an overlapping curbing surrounding the tracks; third, in arresting the motion and clamping the table in any part of its revolution and also gradually arresting the lateral movement the table may receive from collision with other bodies by means of a revolving friction clamp connected with the turning platform, and so arranged as to grasp a curved lip on the outer and lower track in such a manner that its hold will be tightened when clamped by a lateral movement of the platform; fourth, in arranging the different clamping levers, and connecting them with each other, so that with either of the levers, all the clamps around the table are brought into action simultaneously.

The accompanying drawings represent a turning-table embracing my improvements.

This table consists of a circular platform (A) on whose underside are two concentric grooved circular tracks (B, B,) and directly beneath these tracks and of the same form and size are two other tracks (B' B',) which rest on a bed plate (D) or a permanent timber or masonry foundation. Between the upper and lower tracks are a series of spherical hollow balls (E) by which the platform is supported and on which it turns. These balls are cast hollow to diminish their weight, and the cost of constructing the table. The groove (*a*) in the tracks in which they run is made of such form by making it of greater radius of curvature transversely than the balls, thus giving sloping sides to the grooves which admit of the balls moving laterally and being carried up the sloping sides by the platform.

A concave lip (b) is made around the inner side of the outer track to which the platform (A) is clamped by means of elastic friction clamps (c) attached at one end to the platform, and extending radially the other end (d) passes under the lip (b), and is curved to fit the same.

The clamps are operated by a bent lever (o) on the upper side of the platform from the short arm (h) of which and near the fulcrum passes a rod (e) through the platform to the clamp; at the upper end of the rod (e) and above the short arm of the lever is attached a set screw or nut (r) for adjusting its length, thus regulating the pressure of the clamp. A tumbling dog f is pivoted to the outer end of the short arm of the lever for holding the clamp against the lip as it is raised by the depression of the long arm. A rod (g) extends from the dog (f) to the long arm of the lever by which the dog is raised and the clamp released. The dogs (f) on all the levers are held up by means of a clamp on the long arm of the lever where the rod (g) passes it, and the attendant releases the one with which he operates the table. The curved end (d) of the clamp is shorter than the lip, and while it allows the platform to move laterally when clamped, it tends gradually to arrest this movement as it is drawn by the motion of the platform down the curved sides of the lip—and thus clamps the table with greater force.

A double bell crank (k) is connected with each of the rods (e), these cranks are connected with each other by two rods (p), or chains (p) leading from the top of one crank to the bottom of the other, by which means, when one rod (e) is moved by its lever, a movement in the same direction is communicated to the other rods, thus all the clamps are operated by either of the levers at the same time.

A curbing (l) surrounds the exterior of the outer and the interior of the inner circular tracks, and is supported by circular right angle triangle pieces in the inside corners of its entire circle. The curbing around the upper tracks overlapping on the outside of the exterior track, and on the inside of the inner track, thus effectually protecting them (the tracks) from dirt, snow or other substances from falling in on them. The edges of the curbing are beveled off in order more effectually to protect the track, by allowing the joint between the upper and lower curbing to be made closer and still admit of the table moving laterally, as by this movement the platform is raised and the space between the beveled sides of the curbing is increased. The curbing also limits the lateral movement of the platform, and prevents the balls from rolling up the sides of the track beyond a given point.

It will be seen that as the platform is not rigidly confined, it is free to yield laterally to the shocks of bodies coming against it without being permanently displaced, when the platform yields, it carries with it the balls which roll up the inclined sides of the lower track while the inclined sides of the upper track (attached to the platform) roll up on the opposite side of the balls (E). When in this position the tendency of the table is to re-adjust itself as the shock becomes expended or on releasing the clamps (should they have been fastened), which it does by the balls rolling down the sides of the track to the lowest point and carrying with them the platform to its former central position.

I do not confine myself to curved tracks whose radius is greater than that of the balls as an obtuse V shaped track will admit of lateral movement of the table and also of the balls.

This table is not only applicable for railway turn-tables, for the turning of locomotive and other engines, cars etc., but for the turning of bridges, mortar beds and pivot gun-carriages, which on account of its capability of yielding to heavy shocks—without injury and recovering itself, it is peculiarly well adapted.

The advantages of this table over those heretofore constructed are, that its first cost is less, with lighter and less expensive iron work, excavation of pit, foundation and timber, (work), and its stability increased, not liable to get out of order (in any way) with continued use, and working with greater ease, and less wear and decay, with its easy application to all general purposes for which it is intended.

Having thus described my improvements in turning tables, what I claim herein as new and desire to secure by Letters Patent is,

1. The combination of the turning platform arranged without a central pivot or its equivalent, and the grooved circular track the sides of which form inclined planes sloping toward the center of the grooves, with a series of balls arranged in the grooves, whereby the platform of the table is free to yield laterally to shocks and again assume its central position.

2. The combination of the curbing (l) with the platform, track and balls, when arranged in the manner, and for the purpose described.

3. The combination of the clamping mechanism arranged as described, with the turning platform, by which the table may be stopped in any part of its revolution and the lateral movement gradually arrested as described.

4. The combination of the clamping mechanism, with the bell cranks, and connecting rods, or their equivalents, by which, all the clamps are simultaneously brought into action by either of the clamping levers.

In testimony whereof I have subscribed my name.

W. H. WARD.

Witnesses:
J. H. GODDARD,
F. SOUTHGATE SMITH.